United States Patent [19]

Hentschel et al.

[11] 4,158,573

[45] Jun. 19, 1979

[54] CONICAL CENTRIFUGAL BASKET

[75] Inventors: Volkmar Hentschel; Gustav Warner, both of Brunswick, Fed. Rep. of Germany

[73] Assignee: Braunschweigische Maschinenbauanstalt, Brunswick, Fed. Rep. of Germany

[21] Appl. No.: 885,327

[22] Filed: Mar. 10, 1978

[30] Foreign Application Priority Data

May 5, 1977 [DE] Fed. Rep. of Germany ....... 7714228

[51] Int. Cl.[2] ....................... B01D 21/26; B01D 43/00; B04B 1/00; C13F 1/10

[52] U.S. Cl. ................................ 127/19; 210/380 R; 233/1 E; 233/27

[58] Field of Search ....................... 210/380 R; 127/19; 233/1 A, 1 E, 2, 27

[56] References Cited

U.S. PATENT DOCUMENTS

| | | | |
|---|---|---|---|
| 2,052,667 | 9/1936 | Schmelzer | 210/380 X |
| 3,411,631 | 11/1968 | Elsken et al. | 210/380 |
| 3,647,135 | 3/1972 | Mercier | 233/1 A |
| 4,017,022 | 4/1977 | Fiedler | 127/19 |

FOREIGN PATENT DOCUMENTS

| | | | |
|---|---|---|---|
| 1010920 | 6/1957 | Fed. Rep. of Germany | 127/19 |
| 2259232 | 6/1974 | Fed. Rep. of Germany | 127/19 |

*Primary Examiner*—Michael S. Marcus

*Attorney, Agent, or Firm*—W. G. Fasse; D. F. Gould

[57] ABSTRACT

A conical centrifugal basket suitable for continuously operating sugar centrifuges. The basket has at least two sections connected to each other by screws or the like extending through flanges which extend radially outwardly. The separation screen of the basket section having the larger diameter has a radial extension at the smaller diameter end. The radial screen extension is directed radially outwardly and is clamped between the flanges.

6 Claims, 2 Drawing Figures

Fig. 1
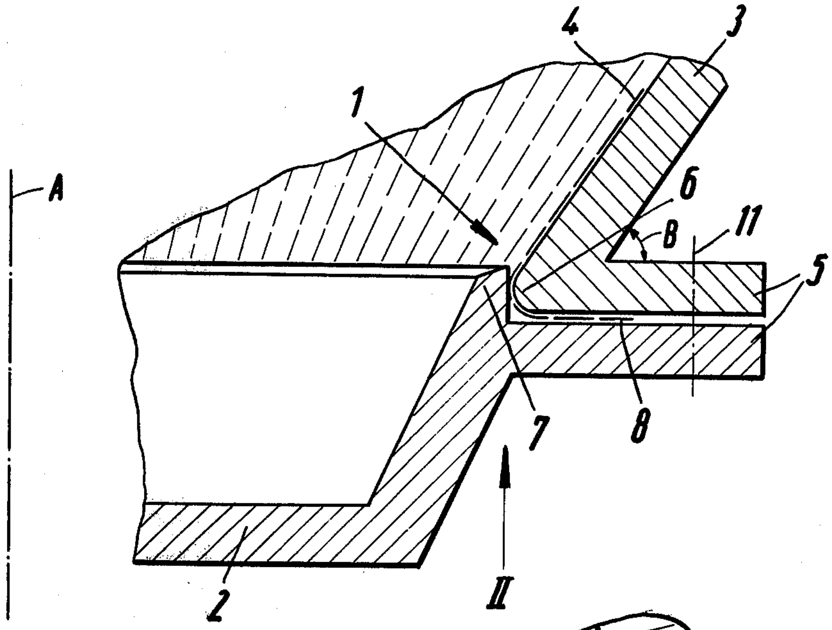
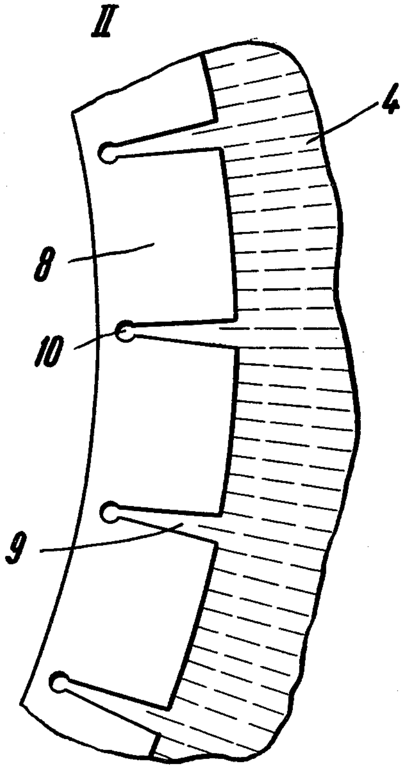
Fig. 2

CONICAL CENTRIFUGAL BASKET

BACKGROUND OF THE INVENTION

The present invention relates to conical centrifugal baskets especially for continuously operating centrifuges, particularly suitable for the centrifuging required in the production of sugar. Such centrifugal baskets are equipped with separation screens arranged inside the basket. The screens may be provided in several segments.

Continuously operating centrifuges equipped with a conical centrifugal basket are receiving an ever increasing acceptance in practice, especially in the sugar industry. The proper function of such centrifuges depends, among other factors, on the proper adaptation or adjustment of several factors relative to each other. Thus, the sliding characteristics of the material to be treated and the sliding characteristics of the screening surface as well as the slope or inclination of the centrifugal basket, that is its cone angle, must be balanced exactly relative to each other. If such balancing is not assured, the material to be centrifuged either is not transported through the centrifugal basket, or rather along its screen or the material follows the axially directed component of the centrifugal force, whereby the material is discharged from the centrifugal basket at a much too high rate.

Since the sliding characteristics of the material passing through the centrifugal basket may vary considerably due to the removal of the liquid phase inside the centrifuge, it is necessary to construct the centrifugal baskets in such a manner that they comprise zones of different cone angles or different slopes. In prior art centrifugal baskets of this type it was customary heretofore to use either a single piece screen or a single piece screen for each segment in the axial direction, whereby the screen was bent in a varying manner in accordance with the varying cone angle or slope. It has also been customary to use for each differently sloped basket section a screen or screen segment which was secured to the basket section by conventional clamping rings at the location of the narrowest diameter of the respective cone section.

In connection with further developements of continuously operating sugar centrifuges it has become necessary to an ever increasing extent to condition the massecuite directly in the centrifuge. Stated differently, it has become necessary to prepare the massecuite in a certain manner for the subsequent separation job. For such preparation it is necessary to provide for certain residence times or durations in predetermined zones of the centrifugal basket. Such residence times are determined by respectively steep basket slopes which, in the extreme may involve basket sections of cylindrical shape.

It has been found that securing the screens in this type of centrifuge in the conventional manner by using clamping rings in each individual section or stage, a relatively complicated screen securing would result. In addition, one would have to take into account especially certain radial, abrupt diameter increases corresponding to the width of the clamping rings. In addition, the useful axial height of the centrifugal basket would be diminished in accordance with the axial height of the clamping rings.

OBJECTS OF THE INVENTION

In view of the above, it is the aim of the invention to achieve the following objects, singly or in combination:

to improve a centrifugal basket, especially for a continuously operating sugar centrifuge in such a manner that the screens or the screen segments or elements may be secured to the inside of the basket without the need for using any substantial inner basket surface area;

to facilitate the maintenance and exchange replacement of the screens in a simple and rapid manner;

to secure the screens to the inner surfaces of the baskets substantially independently of any frictional engagement and without any holes in the inner surface of the basket itself;

to provide a means for securing screens of any kind to the inner surface of a centrifuge basket regardless whether the screens are of extremely thin screen material or extremely hard screen material;

to provide means for securing screens to the inner surface of a centrifugal basket without the need for totally disassemblying the basket sections; and to protect especially that portion of a screen which is subject to the most wear and tear in a conical centrifugal basket of a continuously operating centrifuge, especially a sugar centrifuge.

SUMMARY OF THE INVENTION

According to the invention there is provided a conical centrifugal basket which comprises at least two axially aligned basket sections, whereby preferably each section has a different slope or inclination. The two basket sections are interconnected by means of screws or the like extending through flanges. The separation screen for the basket section having the larger diameter, is provided with a radially outwardly extending collar or extension at the small diameter end thereof. The collar of the screen is clamped between the two flanges of the two adjacent basket sections.

According to a further embodiment of the invention the basket section with the larger diameter merges into its flange with a rounded curve or transition area. The basket section with the narrower diameter comprises an upwardly extending rim above the respective flange means, whereby the rim and the flange form a corner into which said grounded transition area faces.

BRIEF FIGURE DESCRIPTION

In order that the invention may be clearly understood, it will now be described, by way of example, with reference to the accompanying drawings, wherein:

FIG. 1 is an axial sectional view through a portion of a basket according to the invention; and FIG. 2 illustrates also a partial plan view of a screen section as viewed in the direction of the arrow II in FIG. 1.

DETAILED DESCRIPTION OF PREFERRED EXAMPLE EMBODIMENTS

FIG. 1 illustrates a sectional view through a portion of a conical centrifugal basket 1 for continuously operating centrifuges, especially sugar centrifuges. The sectional plane extends through the vertical axis A of the basket. The basket 1 comprises a lower, or smaller diameter basket section 2 and an upper or larger diameter basket section 3. The basket section 2 has lateral side walls with a given slope steeper than the respective slope of the lateral side wall of the basket section 3. If desired, the lateral side walls of the basket section 2 may even have a cylindrical shape or even a negative conical slope. In the latter instance the diameter at the bottom of the section 2 would be somewhat larger than the diameter at the upper end of the section 2. As shown in FIG. 1, the angle between the vertical and the conical side wall of section 3 is larger than the respective angle of the conical section 2. At least the basket section 3 is covered on its inner surface by a screen 4. However, each basket section may be provided with a screen, if desired.

Each basket section 2, 3 is provided with a radially outwardly extending flange 5 extending substantially at a right angle to said vertical axis A. The flanges 5 are clamped together, for example, by screws 11 not shown in detail. The flange 5 of the basket section 3 merges into the lower end of the basket section 3 along a rounded transition zone 6 and the basket wall forms with the respective flange an angle B of less than 90°. The lower basket section 2 is provided with an upwardly extending protective rim 7 which together with the flange 5 of the lower basket section 2 forms a corner. The rounded transition zone 6 faces into the just mentioned corner. The rim 7 extends axially sufficiently upwardly so that it covers the screen in its clamping area around the rounded transition zone 6. Thus, the massecuite cannot contact the screen in the zone covered by the rim 7.

Referring to FIG. 2, the screen 4 is provided with a radially outwardly extending collar 8 extending all around the smaller diameter end of the screen 4. The collar 8 merges into the screen proper also along a rounded zone so that the screen fits properly around the lower rounded zone 6 of the basket section 3. Thus, the collar 8 of the screen may properly be clamped between the flanges 5 without undue strain on the screen, especially since the rim 7 protects the screen where it is bent into its collar 8. As seen in FIG. 1, the collar 8 also extends substantially at a right angle relative to said vertical axis A. In addition, the collar also includes the angle B with the screen proper.

As shown in FIG. 2 the strength of the sieve may be especially increased by arranging slots 9 in the collar 8. These slots avoid an overstressing of the collar region when the latter is bent into the shape as shown in FIG. 1. Further, it is advantageous to provide stress relief holes 10 at the radial inner end of each slot 9. These holes 10 avoid the formation of notching stresses in the screen where its collar 8 merges into the working area of the screen.

The screen may be installed by merely loosening the connecting screws 11 and then clamping the screen in position. A complete removal of the screws is not necessary because the screws preferably do not extend through the collar area or, if they extend through the collar area, the screws should be located in the slots 9. This type of arrangement has the advantage that the individual screen segments may be clamped in position independently of any frictional contact with the inner surface of the respective basket section and without any securing holes in the basket proper nor in the screen itself if one does not consider the slots 9 and holes 10 to be securing holes. This type of securing of the screen greatly facilitates the formation of the collar of the screen because securing holes are not required as mentioned. Thus, according to the invention it is now possible to clamp extremely thin screens as well as extremely hard screens for centrifuges. Further, the rim 7 of the narrow diameter basket section 2 protects the rounded area 6 of the larger diameter basket section 3 and thus the area where the screen or screen segments are subjected to the most wear and tear due to the fact that the largest tension forces occur near the clamping area. In addition, the narrowest diameter portion of the screen is also subject to the most wear and tear due to the material flowing through this narrowest diameter area. The rim 7 also protects the screens in this respect.

From the above description it will be appreciated that the screen elements or sections are easily replaced by merely loosening the screws 11 to the extent necessary to remove the collar 8 past the rim 7 of the narrower diameter basket section 2. The insertion of new segments is also accomplished without completely separating the basket sections from each other.

Although the invention has been described with reference to specific example embodiments, it will be appreciated, that it is intended to cover all modifications and equivalents within the scope of the appended claims.

What is claimed is:

1. A conical centrifugal basket for continuously operating centrifuges having a vertical axis, comprising at least two axial basket sections each having a large and a small diameter arranged for axial alignment to form said conical basket, each basket section comprising flange means for axially interconnecting the basket sections to form the basket, said flange means extending substantially radially outwardly relative to said vertical axis, screen means operatively held in said basket, said screen means comprising at least one screen member having at its small diameter end screen collar means extending substantially radially outwardly relative to said vertical axis, said screen collar means forming an angle of less than 90° relative to said screen member, and means clamping said screen collar means between the flange means of two adjacent basket sections.

2. The centrifugal basket of claim 1, wherein the basket sections have different wall slopes.

3. The centrifugal basket of claim 1, wherein one of said basket sections comprises at its narrower end an inwardly facing, rounded transition zone merging the basket section wall into its radially outwardly extending flange means at said narrower end of said one basket section, and wherein the other of said basket sections comprises at its wider end a rim extending axially beyond the respective radially outwardly extending flange means, said rim covering at least partially said rounded transition zone, when said basket sections are connected at said flange means to form said conical basket, said screen means also having a rounded transition zone merging the screen means proper into said screen collar means.

4. The apparatus of claim 3, wherein said rim and the respective flange means of said other basket section form a corner, said rounded transition zones of said one basket section and of said screen means facing into said corner.

5. The apparatus of claim 1, wherein said screen collar means comprise radially outwardly extending notches.

6. The apparatus of claim 5, wherein said notches open radially outwardly and comprise rounded aperture means at the radially inner end of each notch.

* * * * *